United States Patent
Lin et al.

(10) Patent No.: US 12,400,016 B2
(45) Date of Patent: Aug. 26, 2025

(54) SYSTEM AND METHOD FOR MANAGING DATA-FILE TRANSMISSION AND ACCESS RIGHT TO DATA FILES

(71) Applicant: InfoKeyVault Technology Co., Ltd., Taipei (TW)

(72) Inventors: Chihhung Lin, Taipei (TW); Chia-Hsin Cheng, Taipei (TW); Chia-Jung Liang, Taipei (TW)

(73) Assignee: INFOKEYVAULT TECHNOLOGY CO., LTD., Taipei (TW)

( * ) Notice: Subject to any disclaimer, the term of this patent is extended or adjusted under 35 U.S.C. 154(b) by 385 days.

(21) Appl. No.: 18/121,852

(22) Filed: Mar. 15, 2023

(65) Prior Publication Data
US 2023/0297708 A1    Sep. 21, 2023

(30) Foreign Application Priority Data
Mar. 21, 2022 (TW) ................... 111110275

(51) Int. Cl.
*G06F 21/62* (2013.01)
*G06F 21/30* (2013.01)
(Continued)

(52) U.S. Cl.
CPC .......... *G06F 21/6218* (2013.01); *G06F 21/30* (2013.01); *G06F 21/602* (2013.01); *H04L 9/0822* (2013.01); *H04L 9/085* (2013.01)

(58) Field of Classification Search
CPC .... G06F 21/6218; G06F 21/30; G06F 21/602; G06F 21/107; G06F 2221/2107;
(Continued)

(56) References Cited

U.S. PATENT DOCUMENTS 10,977,631 B2    4/2021    Kahn et al.
10,997,631 B2 *  5/2021    Reis .............. G06Q 30/0261
(Continued)

FOREIGN PATENT DOCUMENTS

| CN | 107483446 | 12/2017 |
| TW | I736271 | 8/2021 |
| TW | 202207665 | 2/2022 |

OTHER PUBLICATIONS

Taiwan Patent Office "Office Action" issued on Aug. 3, 2022, Taiwan.
(Continued)

*Primary Examiner* — Abiy Getachew
(74) *Attorney, Agent, or Firm* — WPAT, PC (57) ABSTRACT

A first user device has first public and private keys and a file encryption key for encrypting the specified file into an encrypted file. A second user device has second public and private keys. A server is in communication with the first and second user devices. The first user device generates temporary public and private keys, performs a first key establishment with the second public key, first private key and temporary private key to generate a shared secret, and uses the shared secret to encrypt the file encryption key into an encrypted key. The server allows the first user device to transmit the first public key, temporary public key, encrypted key and encrypted file to the second user device therevia if both of the first and second user devices pass the identity authentication performed thereby; and the server or the second user device uses the first public key, second private key and temporary public key to perform a second key establishment to retrieve the shared secret, and uses the shared secret, encrypted key and encrypted file to retrieve the specified file for the second user device to access.

15 Claims, 6 Drawing Sheets

(51) Int. Cl.
*G06F 21/60* (2013.01)
*H04L 9/08* (2006.01)

(58) Field of Classification Search
CPC ..... G06F 21/606; H04L 9/0822; H04L 9/085; H04L 9/0847; H04L 63/0435; H04L 63/061; H04L 63/08; H04L 63/123; H04L 67/06; H04L 9/0861; H04L 9/3247; H04L 63/0442
See application file for complete search history.

(56) References Cited

U.S. PATENT DOCUMENTS

| 11,290,260 | B1* | 3/2022 | Firestone | G06F 21/602 |
| 2020/0265427 | A1 | 8/2020 | Osborn et al. | |
| 2020/0268757 | A1* | 8/2020 | Warrell, Jr. | C07D 401/14 |
| 2023/0254119 | A1* | 8/2023 | Valkaitis | H04L 9/0822 |
| | | | | 380/46 |
| 2025/0158809 | A1* | 5/2025 | Badrinarayanan | H04L 9/008 |

OTHER PUBLICATIONS

EESR issued on Jul. 18, 2023.
M. Forgerock N. Public Key Authentication Enryption For Jose: ECDH-1PU. Network Working Group. May 10, 2019. pp. 1-22.

* cited by examiner

SYSTEM AND METHOD FOR MANAGING DATA-FILE TRANSMISSION AND ACCESS RIGHT TO DATA FILES

FIELD OF THE INVENTION

The present invention relates to system and method for managing data-file transmission and access right to data files, and more particularly to system and method for managing data-file transmission and access right to data files in a communication network or a data processing system.

BACKGROUND OF THE INVENTION

In current communication networks and data processing systems, it is critical to secure data files transmitted from a sender to a receiver. The data files should be protected not only from being tampered with, but also from being listened in during transmission. Among the popular technologies, the PGP (Pretty Good Privacy) encryption protocol, for example, is a widely used method of data encryption and transmission. However, it requires the user to create a password and designate an information channel to transmit the password. Therefore, it is not feasible to manage files and groups in a systemic manner. Furthermore, the file access right in a conventional file server is substantially managed by way of the user's identity. Once a design flaw or configuration oversight in the operating system or application is exploited, an advanced access privilege higher than the default access right would be taken, and unauthorized access could be executed.

SUMMARY OF THE INVENTION

Therefore, the present invention addresses and overcomes the shortcomings of the vulnerability of access rights to unauthorized changes, caused by the requirements of passwords and transmission channels.

In a first aspect of the present invention, a system for managing data-file transmission and access right to a specified file, comprising: a first user device having a pair of first public key and first private key and a file encryption key, which is used to encrypt the specified file into an encrypted file; a second user device having a pair of second public key and second private key; and a server in communication with the first user device and the second user device, performing identity authentication for the first user device and the second user device. For transmitting the encrypted file from the first user device to the second user device, the first user device generates a pair of temporary public key and temporary private key, acquires the second public key of the second user device, performs a first key establishment with the second public key, the first private key and the temporary private key to generate a shared secret, and uses the shared secret to encrypt the file encryption key into an encrypted key; the server allows the first user device to transmit the first public key, the temporary public key, the encrypted key and the encrypted file to the second user device therevia if both of the first and second user devices pass the identity authentication; and the server or the second user device uses the first public key, the second private key and the temporary public key to perform a second key establishment to retrieve the shared secret, and uses the shared secret, the encrypted key and the encrypted file to retrieve the specified file for the second user device to access.

In a second aspect of the present invention, a method for managing data-file transmission and access right to a specified file between a first user device having a pair of first public key and first private key and a second user device having a pair of second public key and second private key via a server, comprising: the first user device using a file encryption key to encrypt the specified file into an encrypted file; the first user device generating a pair of temporary public key and temporary private key, acquiring the second public key of the second user device, performing a first key establishment with the second public key, the first private key and the temporary private key to generate a shared secret, and using the shared secret to encrypt the file encryption key into an encrypted key; the server performing identity authentication for the first user device and the second user device; and the first user device, which passes the identity authentication, transmitting the first public key, the temporary public key, the encrypted key and the encrypted file to the second user device, which also passes the identity authentication, via the sever for the second user device to retrieve the specified file.

In a third aspect of the present invention, a system for managing data-file transmission and access right to a specified file, comprising: a first user device having a pair of first public key and first private key and a file encryption key, which is used to encrypt the specified file into an encrypted file; a second user device having a pair of second public key and second private key; and a server in communication with the first user device and the second user device, performing identity authentication for the first user device and the second user device. For transmitting the encrypted file from the first user device to the second user device, the first user device acquires the second public key of the second user device, uses the second public key to encrypt the file encryption key into an encrypted key; the server allows the first user device to transmit the encrypted key and the encrypted file to the second user device therevia if both of the first and second user devices pass the identity authentication; and the server or the second user device uses the encrypted key and the encrypted file to retrieve the specified file for the second user device to access.

In a fourth aspect of the present invention, a method for managing data-file transmission and access right to a specified file between a first user device having a pair of first public key and first private key and a second user device having a pair of second public key and second private key via a server, comprising: the first user device using a file encryption key to encrypt the specified file into an encrypted file; the first user device acquiring the second public key of the second user device, and using the second public key to encrypt the file encryption key into an encrypted key; the server performing identity authentication for the first user device and the second user device; and the first user device, which passes the identity authentication, transmitting the encrypted key and the encrypted file to the second user device, which also passes the identity authentication, via the sever for the second user device to retrieve the specified file.

In a fifth aspect of the present invention, a system for managing data-file transmission and access right to a specified file, comprising: a first user device corresponding to a pair of first public key and first private key; a second user device corresponding to a pair of second public key and second private key; and a server in communication with the first user device and the second user device. The first user device or the server uses a file encryption key to encrypt the specified file into an encrypted file, uses the second public key to encrypt the file encryption key into a first encrypted key, processes the encrypted file into a ciphertext file having a specific file header format containing the first encrypted key, and stores the ciphertext file into the server so that the second user device is allowed to use the second private key to decrypt the ciphertext file and retrieve the specified file.

In a sixth aspect of the present invention, a method for managing data-file transmission and access right to a specified file between a first user device corresponding to a pair of first public key and first private key and a second user device corresponding to a pair of second public key and second private key via a server, comprising: the first user device or the server using a file encryption key to encrypt the specified file into an encrypted file; the first user device or the server acquiring the second public key of the second user device, and using the second public key to encrypt the file encryption key into a first encrypted key; the first user device or the server processing the encrypted file into a ciphertext file having a specific file header format containing the first encrypted key, and storing the ciphertext file into the server so that the second user device is allowed to use the second private key to decrypt the ciphertext file and retrieve the specified file.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Data encryption and transmission executed by a system for managing data-file and access right to data files according to an embodiment of the present invention is described hereinafter with reference to the scheme of FIG. 1. In Steps 111, 112 and 113, which can be executed in an arbitrary order, the sender 11 prepares a file F to be transmitted, acquires a public key $PU_b$ of a receiver 12, and generates a file encryption key $d_k$. Then in Step 114, the file F is encrypted with the file encryption key $d_k$ to generate an encrypted file $[E(d_k, F)]$. The encryption in Step 114 can be executed by Authenticated Encryption with Associated Data (AEAD). For example, the currently available Advanced Encryption Standard-Galois/Counter Mode (AES-GCM) can be used for encryption, and meanwhile assure of the security, integrity and identifiability of the file F. Subsequently in Step 115, key establishment is performed to obtain a shared secret SS. The key establishment may be conducted based on a key agreement protocol, e.g., Elliptic Curve Diffie-Hellman key exchange(2s,1e), which is also known as ECDH(2s,1e)). For example, the shared secret SS of the sender 11 is established with the public key $PU_b$ of the receiver 12 mentioned in Step 112, the private key $PR_a$ of the sender 11 and the temporary private key $PR_e$ of the sender 11. In Step 116, the encrypted key $[E(SS, d_k)]$ is formed by encrypting the file encryption key $d_k$ with the shared secret established in Step 115. Afterwards, the sender 11 processes a temporary public key $PU_e$ of the sender 11, the encrypted file $[E(d_k, F)]$ and the encrypted key $[E(SS, d_k)]$ into a data packet ($PU_e$, $[E(d_k, F)]$, $[E(SS, d_k)]$) and transmits the data packet to the receiver 12 (Step 117). The pair of temporary public key $PU_e$ and temporary private key $PR_e$ of the sender 11 can only be consecutively used a limited number of times, or even once, and then discarded. A new pair of temporary public and private keys will be generated when the sender 11 is going to send another encrypted file.

Meanwhile, the receiver 12, which receives the data packet ($PU_e$, $[E(d_k, F)]$, $[E(SS, d_k)]$), executes a request to obtain a public key $PU_a$ of the sender 11 (Step 121) for key establishment (Step 122). Then the receiver 12 performs another key establishment with the public key $PU_a$ of the sender 11 mentioned in Step 121, a private key $PR_b$ of the receiver 12, and the temporary public key $PU_e$ received from the sender 11 to retrieve the shared secret SS. With the shared secret SS, the receiver 12 can decrypt the encrypted key $[E(SS, d_k)]$ to retrieve the file encryption key $d_k$ (Step 123). The file encryption key $d_k$ is then used to decrypt the encrypted file so as to retrieve the file F (Step 124).

Figure 1:
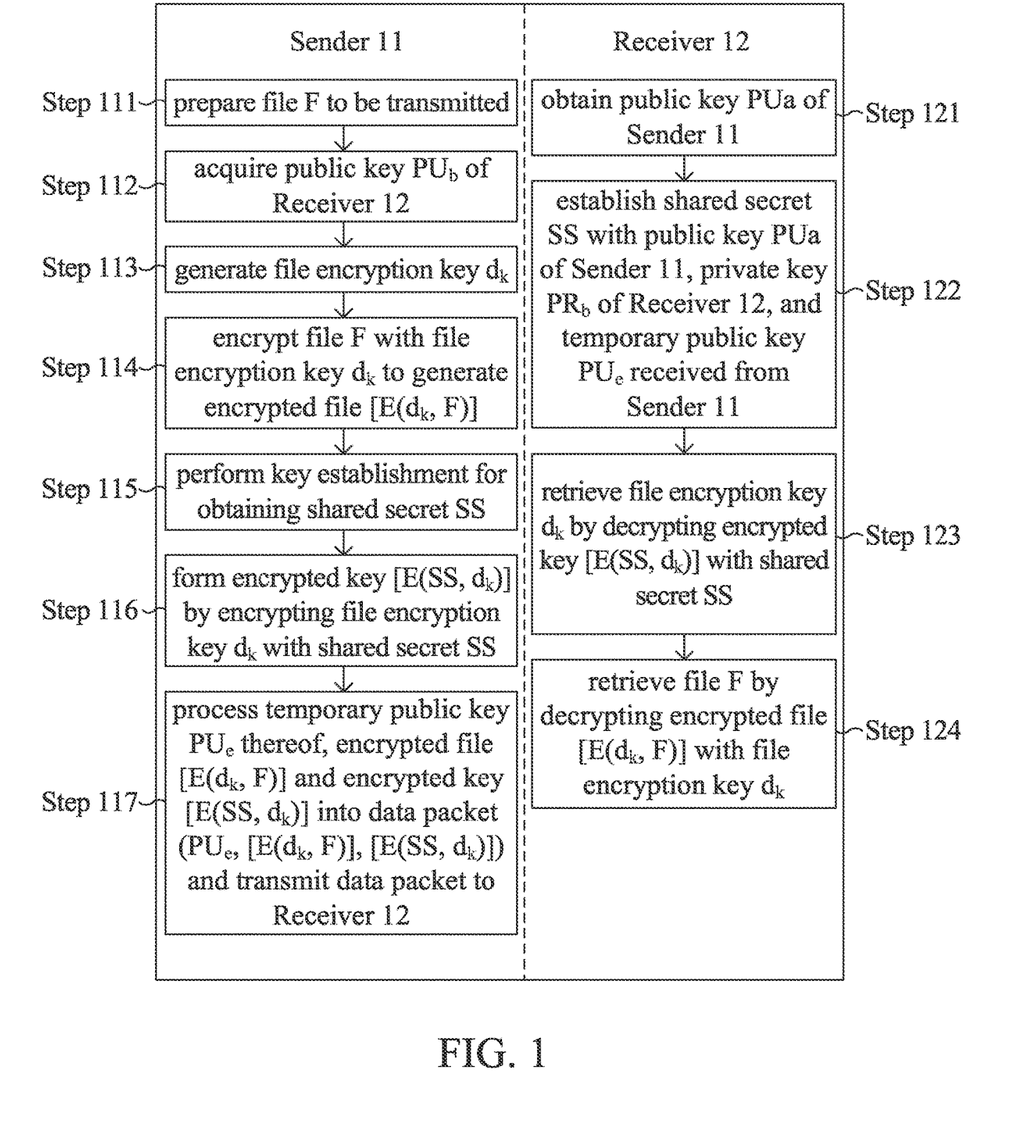
FIG. 1 is a scheme illustrating data encryption and transmission conducted according to an embodiment of the present invention.
Figure 2:
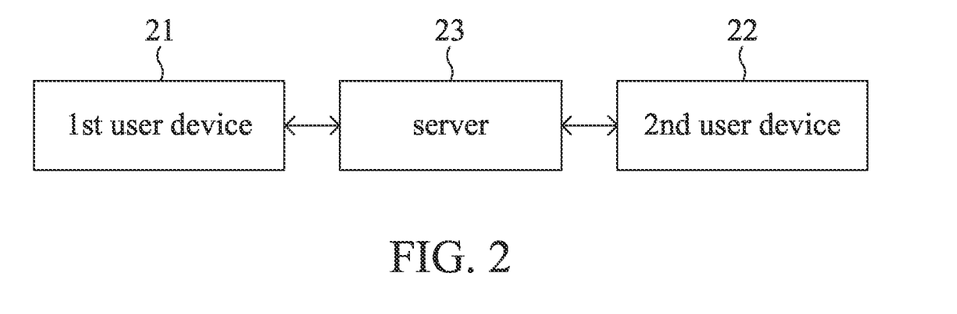
FIG. 2 is a block diagram schematically illustrating a system, which conducts the data encryption and transmission illustrated in FIG. 1, according to an embodiment of the present invention.

Please refer to FIG. 2, which schematically illustrates an embodiment of data file transmission system adapted to execute the data encryption and transmission illustrated in FIG. 1 according to the present invention. The system includes a first user device 21, a second user device 22 and a server 23. The server 23 communicates with the first user device 21 and the second user device 22 via a network, e.g., Internet. The first user device 21 generates a first pair of public and private keys, and the second user device 22 generates a second pair of public and private keys. In the following example for illustrating the principle and the practical operation of the present invention, the first user device 21 serves as the sender 11, and the second user device 22 serves as the receiver 12. That is, the first user device 21 generates the first public key $PU_a$ and the first private key $PR_a$, and the second user device 22 generates the second public key $PU_b$ and the second private key $PR_b$. For securely transmitting the file F to the second user device 22, the first user device 21 acquires the public key $PU_b$ from the second user device 22 directly or via the sever 23, and encrypts the file F with a file encryption key $d_k$ to generate an encrypted file $[E(d_k, F)]$. The first user device 21 uses the second public key $PU_b$, the first private key $PR_a$ and the temporary private key $PR_e$ to establish the shared secret SS, which is used for encrypting the file encryption key $d_k$ into an encrypted key $[E(SS, d_k)]$, according to the key-agreement protocol ECDH (2s, 1e). Once the first user device 21 and the second user device 22 both pass the authentication required by the server 23, the server 23 allows the first user device 21 to send the encrypted file $[E(d_k, F)]$, as well as the first public key $PU_a$, the temporary private key $PR_e$ and the encrypted key $[E(SS, d_k)]$, to the second user device 22 via the server 23. The second user device 22 uses its own second private key $PR_b$ and the first public key $PU_a$ and temporary private key $PR_e$ received from the first user device 21 via the server 23 to conduct key establishment, thereby retrieving the shared secret SS. The second user device 22 then uses the shared secret SS to retrieve the file encryption key $d_k$ from the encrypted key $[E(SS, d_k)]$, and uses the file encryption key $d_k$ to retrieve the file F from the encrypted file $[E(d_k, F)]$. In an alternative example, after the server 23 receives the encrypted file $[E(d_k, F)]$, the first public key $PU_a$, the temporary private key $PR_e$ and the encrypted key $[E(SS, d_k)]$ from the first user device 21, the server 23 conducts key establishment with the first public key $PU_a$ and temporary private key $PR_e$ received from the first user device 21 and the second private key $PR_b$ provided by the second user device 22 to retrieve the shared secret SS, and uses the shared secret SS, the encrypted key $[E(SS, d_k)]$ and the encrypted file $[E(d_k, F)]$ to retrieve the file F as mentioned above. Afterwards, the server 23 transfers the file F to the second user device 22 to complete the secured file transmission.

Figure 3:
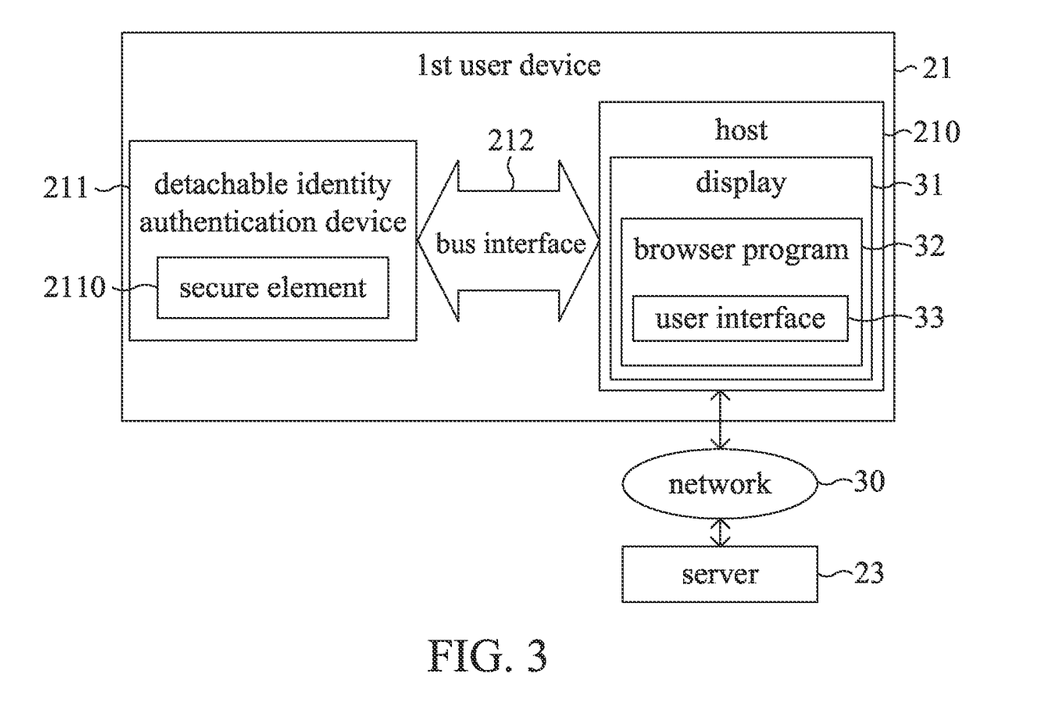
FIG. 3 is a block diagram schematically illustrating an example of the first user device included in the system of FIG. 2, which communicates with the server via a network.

An embodiment of the first user device 21 is now illustrated with reference to the block diagram shown in FIG. 3. The first user device 21 includes a host 210 and a detachable identity authentication and encryption device 211. The host 210 communicates with the server 23 via a network 30 such as Internet or a wide area network. The identity authentication and encryption device 211 communicates with the host 210 via a bus interface 212 when the host 210 and the identity authentication and encryption device 211 are both electrically connected to the bus interface 212. The bus interface 212, for example, may be a USB interface or any other suitable bus interface. The identity authentication and encryption device 211 stores therein the first private key $PR_a$, e.g., stored in a secure element 2110 thereof, and releases the first public key $PU_a$ pairing the first private key $PR_a$. The identity authentication and encryption device 211 can use the first private key $PR_a$ to pass an authentication procedure. For example, the authentication procedure can be executed by the server 23, which uses a previously obtained identity public key $PU_1$ of a specified device to verify a digital signature derived from an identity private key $PR_1$ of the specified device. Details of the authentication procedure can be further realized from a co-pending U.S. patent application Ser. No. 17/577,411, which is incorporated herein for reference. After the authentication procedure, the secure element 2110 of the identity authentication and encryption device 211 establishes the shared secret SS with the second public $PU_b$, which is released by the second user device 22, and the first private $PR_a$ and temporary private key $PR_e$ of the first user device 21 according to the key-agreement protocol ECDH(2s, 1e). Afterwards, the shared secret SS is used to encrypt the file encryption key $d_k$ to generate the encrypted file $[E(d_k, F)]$, which is then transmitted to the server 23 or further transferred to the second user device 22 via the server 23.

Furthermore, after the server 23 determines that the identity authentication and encryption device 211 passes the authentication procedure, e.g., by way of verifying the digital signature as mentioned above, the host 210 runs a browser program 32 to have the display 31 show a user interface 33, which is originated from the server 23. Via the user interface 33, a user may input commands, which are differentially authorized by the server 23 to different users, to access and/or transfer files. For achieving a high level of information security, the WebAuthn standard of the commercially available FIDO2 (Fast Identity Online 2) protocol can be used as an example of the communication protocol. Accordingly, the above-described authentication process should conform to the FIDO2 protocol.

In an embodiment, the second user device 22, as a receiver, may have functional means similar to those of the first user device 21 as described above. In another embodiment, the second user device 22 does not have the identity authentication and encryption device 211, and instead, the second user device 22 may be implemented with the one illustrated in FIG. 4. As shown, the second user device 22 includes a host 220 and a detachable identity authentication and encryption device 221. The host 220 communicates with the server 23 via the network 30, e.g., Internet or wide area network. The identity authentication and encryption device 221 communicates with the host 220 via a bus interface 222 when the host 220 and the identity authentication and encryption device 221 are both electrically connected to the bus interface 222. The bus interface 222, for example, may be a USB interface or any other suitable bus interface. When the identity authentication and encryption device 221 passes the authentication conducted by the server 23, the host 210 runs a browser program 42 to have a display 41 show a user interface 33, which is originated from the server 23. Via a user interface 43, a user may input commands, which are differentially authorized by the server 23 to different users, to access and/or transfer files. Likewise, the WebAuthn standard of the commercially available FIDO2 (Fast Identity Online 2) protocol can be used as an example of the communication protocol. Accordingly, the above-described authentication process should conform to the FIDO2 protocol. The hosts 210 and 220 used in the above embodiments may be personal computers, tablet computers, smart phones, or any other similar information-processing hosts.

Figure 4:
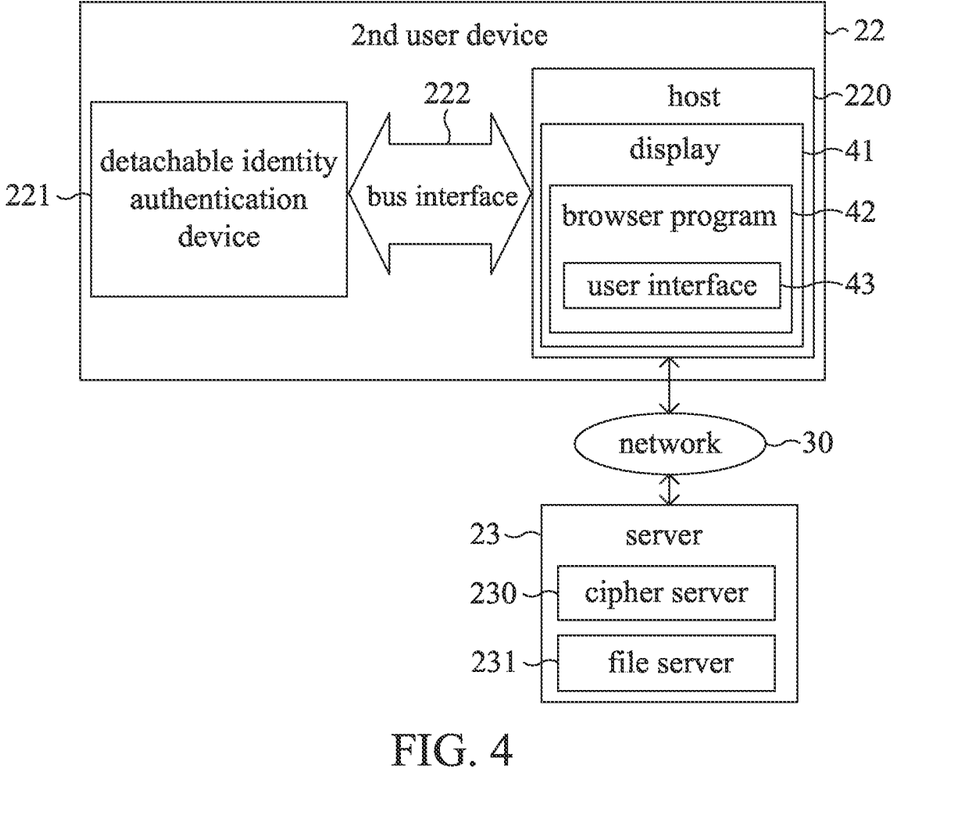
FIG. 4 is a block diagram schematically illustrating an example of the second user device included in the system of FIG. 2, which communicates with the server via a network.

In this embodiment, the identity authentication and encryption device 211 does not have encryption/decryption operating means, so the decryption operations at the second user device 22 are executed by a cipher server 230 included in the server 23. The cipher server 230 uses the first public $PU_a$ released by the first user device 21, the second private key $PR_b$ of the second user device 22 and the temporary private key $PU_e$ of the first user device 21 to establish the shared key SS. The cipher server 230 then decrypts the encrypted key $[E(SS, d_k)]$ with the shared secret SS, retrieves the file encryption key $d_k$ with the encrypted key $[E(SS, d_k)]$, and retrieves the file F with the file encryption key $d_k$. The file F is then stored into a file server 231 included in the server 23 or transferred to the second user device 22.

Figure 5:
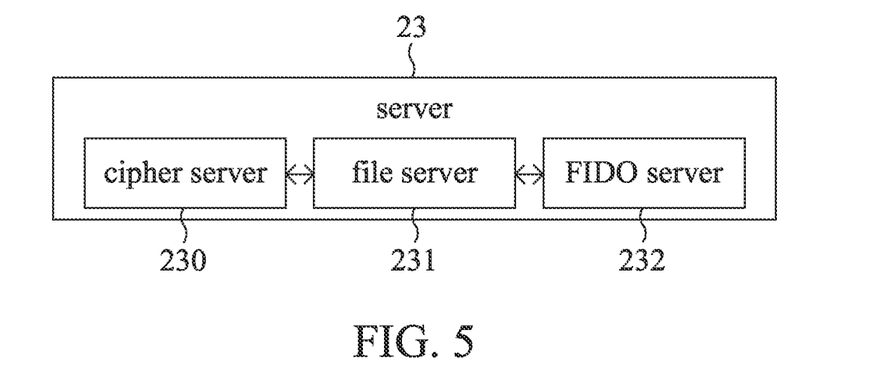
FIG. 5 is a block diagram schematically illustrating an example of the sever included in the system of FIG. 2.

Please refer to FIG. 5, which schematically illustrates a block diagram of an embodiment of the server 23. The server 23 includes a cipher server 230, a file server 231 and a FIDO server 232. The cipher server 230 functions for performing the encryption/decryption operation for a detachable identity authentication and encryption device that does not perform any encryption/decryption operation. The file server 231 functions for temporarily storing the encrypted file and the user interface program to run in the browser at the user end. The file server 231 further works as a relying party application server (RP app server), which functions for registration and verification of users. The FIDO server 232 can be disposed at a distant end, and shared with another server in addition to the server 23.

Figure 6:
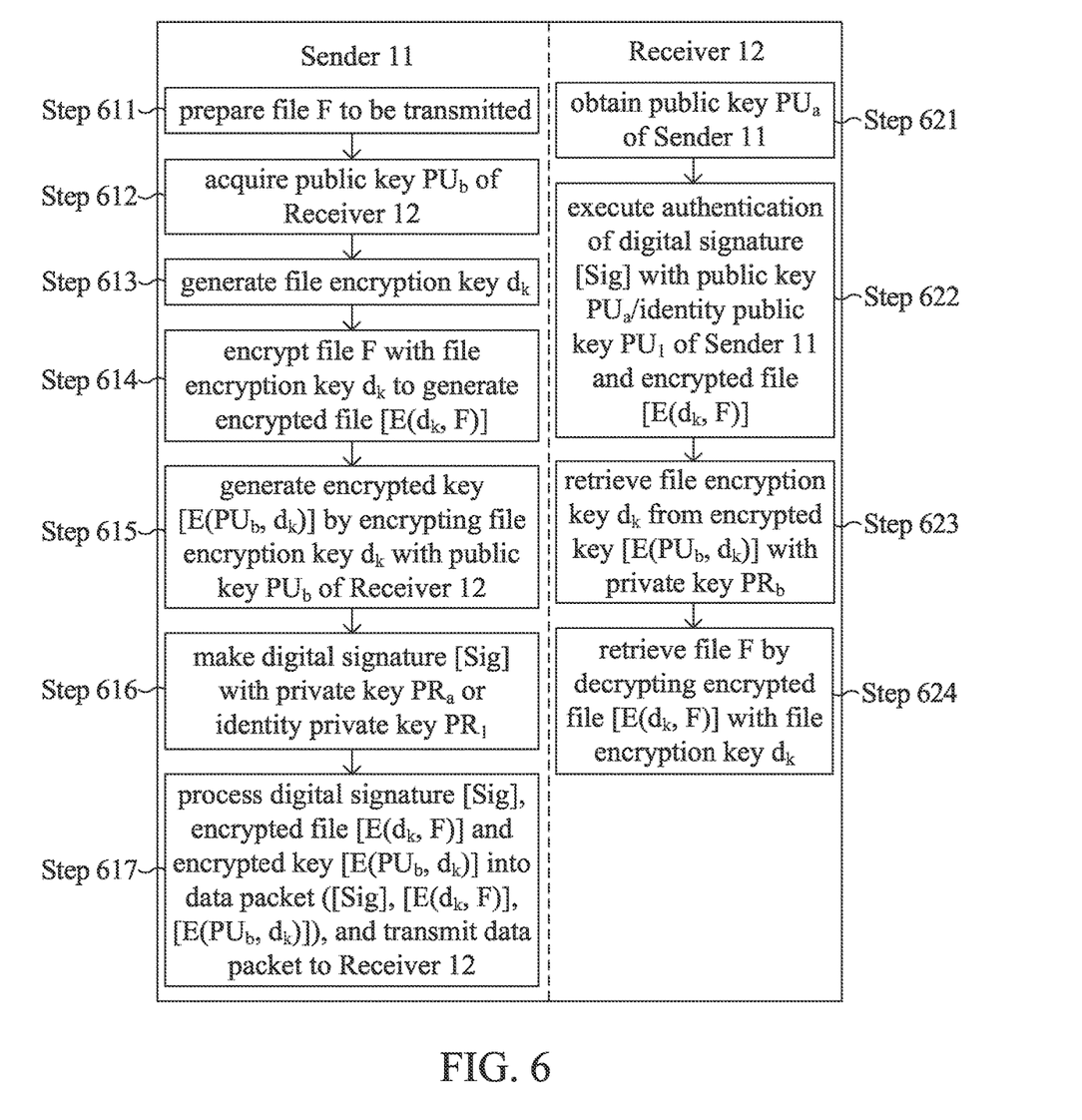
FIG. 6 is a scheme illustrating data encryption and transmission conducted according to another embodiment of the present invention.

FIG. 6 shows another embodiment of data encryption and transmission conducted according to the present invention. In Steps 611, 612 and 613, which can be executed in an arbitrary order, the sender 11 prepares a file F to be transmitted, acquires a public key $PU_b$ of a receiver 12, and generates a file encryption key $d_k$. Then in Step 614, the file F is encrypted with the file encryption key $d_k$ to generate an encrypted file [E($d_k$, F)]. The encryption in Step 614 can be executed by Authenticated Encryption with Associated Data (AEAD). For example, the currently available Advanced Encryption Standard-Galois/Counter Mode (AES-GCM) can be used for encryption, and meanwhile assure of the security, integrity and identifiability of the file F.

Subsequently in Step 615, key transport is performed. The sender 11 uses the public key $PU_b$ of the receiver 12 to encrypt the file encryption key $d_k$ into an encrypted key [E($PU_b$, $d_k$)]. The sender 11 further uses a private key $PR_a$ or identity private key $PR_1$ thereof to make a digital signature [Sig] for the encrypted file [E($d_k$, F)] (Step 616). Afterwards, the sender 11 incorporates the digital signature [Sig], the encrypted file [E($d_k$, F)] and the encrypted key [E($PU_b$, $d_k$)] into a data packet ([Sig], [E($d_k$, F)], [E($PU_b$, $d_k$)]), and transmits the data packet ([Sig], [E($d_k$, F)], [E($PU_b$, $d_k$)]) to the receiver 12 (Step 617).

On the other hand, the receiver 12 acquires a public key $PU_a$ or an identity public key $PU_1$ of the sender 11 in Step 621, and executes an verifying procedure of the digital signature [Sig] in Step 622. When it is determined, by way of the public key $PU_a$ or the identity public key $PU_1$ of the sender 11 and the encrypted file [E($d_k$, F)], that the digital signature [Sig] is correct, the receiver 12 retrieves the file encryption key $d_k$ from the encrypted key [E($PU_b$, $d_k$)] with a private key $PR_b$ of the receiver 12 in Step 623. Subsequently in Step 624, the receiver 12 retrieves the file F from the encrypted file [E($d_k$, F)] with the file encryption key $d_k$. In this embodiment, key transport, instead of key agreement, is used to provide the key for the receiver to retrieve the file.

In the case of more than one receiver, the same key combination, which consists of file encryption key $d_k$, temporary public key $PU_e$ of the sender and temporary private key $PR_e$ of the sender, can be used to support transmission to the multiple receivers. For example, by way of key agreement, the same file encryption key $d_k$ and encrypted file [E($d_k$, F)] to be transmitted from a sender A to multiple receivers, e.g., B, C and D, can be processed with the temporary private key $PR_e$ of the sender in respective key agreements between the sender A and the receivers B, C and D to generate respective shared secrets SSab, SSac and SSad. In this embodiment, after respective encrypted keys [E(SSab, $d_k$)], [E(SSac, $d_k$)] and [E(SSad, $d_k$)] are formed by encrypting the file encryption key $d_k$ with the shared secrets, the sender A processes the temporary public key $PU_e$ of the sender A, the encrypted file [E($d_k$, F)] and the encrypted keys [E(SSab, $d_k$)], [E(SSac, $d_k$)] and [E(SSad, $d_k$)] into a data packet, and transmits the data packet to each of the receivers. Accordingly, it is simple to perform the secured key and file transmission to one more receiver by conducting an additional key agreement between the sender and the additional receiver to generate a shared secret between the sender and the additional receiver. The shared secret is used to form an encrypted key specific to the additional receiver. Then the encrypted key specific to the additional receiver is added to the data packet containing the encrypted keys of the other receivers.

In the above embodiments, the sender is a single user device, i.e., the first user device 21, and the receiver is also a single user device, i.e., the second user device 22. Alternatively, the sender may also be a first group of user devices having a common pair of first public key and first private key, and the receiver may be a second group of user devices having a common pair of second public key and second private key. Since multiple user devices correspond to the same pair of public and private keys, the resource and cost for establishing multiple pairs of public and private keys can be saved. Details will be described as follows.

Figure 7A:
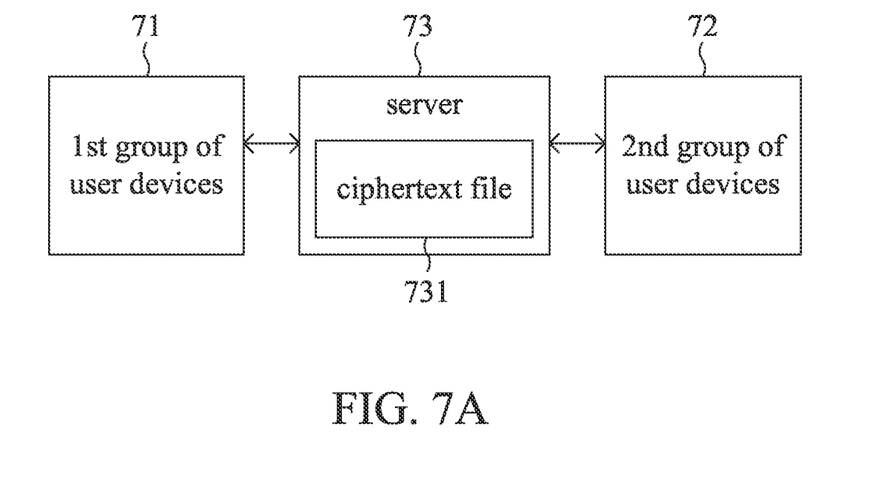
FIG. 7A is a block diagram schematically illustrating a system, which conducts the data encryption and transmission illustrated in FIG. 6, according to an embodiment of the present invention.

Please refer to FIG. 7A, in which a system for managing data-file transmission and access right to data files according to another embodiment of the present invention is illustrated. The system in this embodiment includes a first group of user devices 71 having a common pair of first public key and first private key, a second group of user devices 72 having a common pair of second public key and second private key, and a server 73. The first public key and the second public key can be uploaded for exchange. The server 73 is in communication with the first group of user devices 71 and the second group of user devices 72. A ciphertext file 731, which contains an encrypted file [E($d_k$, F)] and has a specific file header format 7311, can be stored in the server 73, wherein the encrypted file [E($d_k$, F)] is generated by encrypting a file F to be transmitted with a file encryption key $d_k$.

Figure 7B:
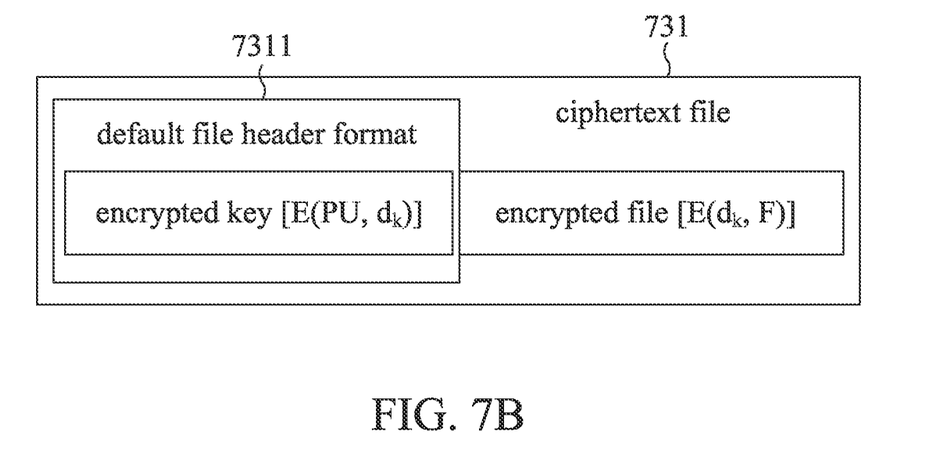
FIG. 7B is a block diagram schematically illustrating an example of the ciphertext file included in the server of FIG. 7A.

Furthermore, the specific file header format 7311 at least includes an encrypted key [E(PU, $d_k$)], which is generated by the server 73 or a user device by encrypting the encryption key $d_k$ with a public key PU, as illustrated in FIG. 7B. Therefore, a user device, which owns a private key paired with the public key PU, would have the right to open the ciphertext file 731. For example, if the encrypted key [E(PU, $d_k$)] of the file header format 7311 of the ciphertext file 731 is generated by encrypting the file encryption key $d_k$ with a first public key, then any user device in the first group can use the common first private key paired with the common first public key to open the ciphertext file 731. In other words, the right of each user device to access a specified file can be effectively managed by encrypting the file with a proper public key. The encryption of the file may also be executed by the server or the user device. In addition, the risk that an advanced access right is improperly acquired due to design flaws or configuration oversights existing in the operational system or application programs can be avoided, thereby eliminating security vulnerability as executing unauthorized access actions.

Figure 8A:
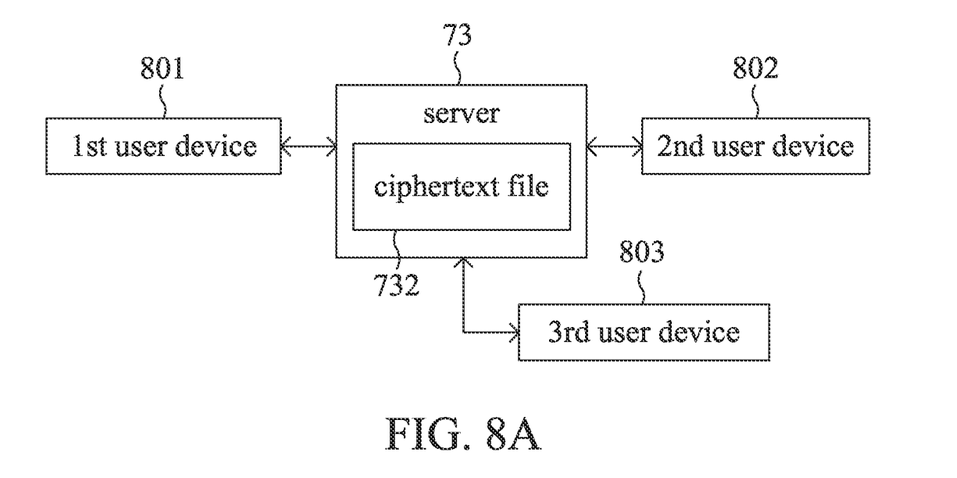
FIG. 8A is a block diagram schematically illustrating a system, which conducts the data encryption and transmission illustrated in FIG. 6, according to another embodiment of the present invention.

Please refer to FIG. 8A, in which a system for managing data-file transmission and access right to data files according to a further embodiment of the present invention is illustrated. The system in this embodiment includes a first user devices 801 having a pair of first public key and first private key, a second user devices 802 having a pair of second public key and second private key, and a third user devices 803 having a pair of third public key and third private key, which are in communication with the server 73. An encrypted file 81 is generated by the first user device 801 or the server 73 by encrypting a file F to be transmitted with a file decryption key by the first user device 801 or the server 804. Meanwhile, the file decryption key is encrypted with the second public key and the third public key into an encrypted key 82 and an encrypted key 83, respectively.

Figure 8B:
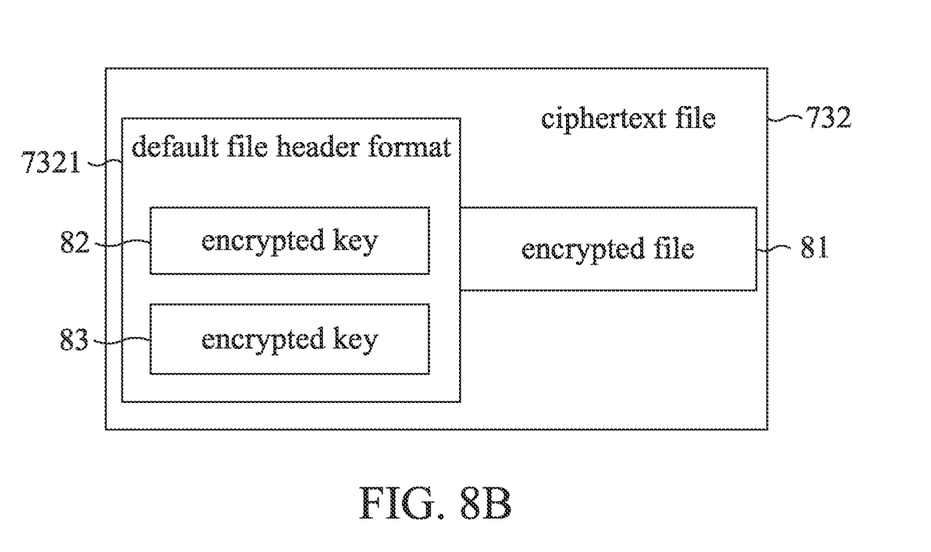
FIG. 8B is a block diagram schematically illustrating an example of the ciphertext file included in the server of FIG. 8A.

Then a ciphertext file 732 is derived from the encrypted file 81 by way of the encrypted key 82 and the encrypted key 83, and stored into the server 73. Afterwards, the second user device 802 or the third user device 803 can decrypt the ciphertext file 732 with its own second private key or third private key to retrieve the file F. It is to be noted that in this embodiment, the ciphertext file 732 has a default file header format 7321, which includes the encrypted key 82 and the encrypted key 83 at the same time. Of course, the default file header format 7321 may include more encrypted keys in addition to the encrypted key 82 and the encrypted key 83 when more user devices are involved for transmission of the file F.

The default file header format 7321 mentioned above may be of a constant bit-length no matter how many encrypted keys are included. Such a design is advantageous in hiding the count and forms of keys from being reckoned by non-related persons, thereby further enhancing information security. Furthermore, like the embodiments illustrated in FIGS. 3, 4 and 5, an external identity authentication and encryption device can be detachably connected to any of the user devices via a bus interface and used to conduct identity authentication. The identity authentication and encryption device stores therein the private key of the corresponding user device. Once the server 73 determines that the identity authentication and encryption device passes the authentication, e.g., by way of verifying the digital signature as mentioned above, the corresponding user device automatically runs a browser program to have the display show a user interface, which is originated from the server 73. Via the user interface, a user may input data or commands.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A system for managing data-file transmission and access right to a specified file, comprising:
   a first user device having a pair of first public key and first private key and a file encryption key, which is used to encrypt the specified file into an encrypted file;
   a second user device having a pair of second public key and second private key; and
   a server in communication with the first user device and the second user device, performing identity authentication for the first user device and the second user device,
   wherein for transmitting the encrypted file from the first user device to the second user device, the first user device generates a pair of temporary public key and temporary private key, acquires the second public key of the second user device, performs a first key establishment with the second public key, the first private key and the temporary private key to generate a shared secret, and uses the shared secret to encrypt the file encryption key into an encrypted key; the server allows the first user device to transmit the first public key, the temporary public key, the encrypted key and the encrypted file to the second user device therevia if both of the first and second user devices pass the identity authentication; and the server or the second user device uses the first public key, the second private key and the temporary public key to perform a second key establishment to retrieve the shared secret, and uses the shared secret, the encrypted key and the encrypted file to retrieve the specified file for the second user device to access.

2. The system according to claim 1, wherein the first user device includes a host and a detachable identity authentication and encryption device in communication with the host via a bus interface, wherein the identity authentication and encryption device stores therein the first private key, which is used to pass the identity authentication, generates the file encryption key and the pair of temporary public key and temporary private key, uses the file encryption key to encrypt the specified file into the encrypted file, acquires the second public key, performs the first key establishment with the second public key, the first private key and the temporary private key to generate the shared secret, uses the shared secret to encrypt the file encryption key into the encrypted key, and transmits the first public key, the temporary public key, the encrypted key and the encrypted file to the second user device, which also passes the identity authentication, via the server.

3. The system according to claim 1, wherein the second user device includes a detachable identity authentication and encryption device; when the identity authentication and encryption device is detachably connected to a bus interface of the second user device, the server executes the identity authentication of the second user device; and the second user device automatically runs a browser program to have a display show a user interface for a user to input data if the second user device passes the identity authentication.

4. The system according to claim 3, wherein the server is a server set including a cipher server, a file server and a Fast Identity Online (FIDO) server, wherein the cipher server performs encryption/decryption for the detachable identity authentication and encryption device, the file server temporarily stores the encrypted file and the browser program, and works as a relying party application server (RP app server) for registration and verification of users, and the FIDO server is disposed at a distant end and allowed to be shared with an external server.

5. A system for managing data-file transmission and access right to a specified file, comprising:
   a first user device having a pair of first public key and first private key and a file encryption key, which is used to encrypt the specified file into an encrypted file;
   a second user device having a pair of second public key and second private key; and
   a server in communication with the first user device and the second user device, performing identity authentication for the first user device and the second user device,
   wherein for transmitting the encrypted file from the first user device to the second user device, the first user device acquires the second public key of the second user device, uses the second public key to encrypt the file encryption key into an encrypted key; the server allows the first user device to transmit the encrypted key and the encrypted file to the second user device therevia if both of the first and second user devices pass the identity authentication; and the server or the second user device uses the encrypted key and the encrypted file to retrieve the specified file for the second user device to access.

6. The system according to claim 5, wherein the first user device further uses the first private key or an identity private key to make a digital signature for the encrypted file, and the digital signature is transmitted to the second user device via the server along with the first public key or an identity public key pairing the identity private key, the encrypted key and the encrypted file; and the server or the second user device uses the first public key or identity public key and the encrypted file to verify the digital signature.

7. The system according to claim 6, wherein the first user device includes a host and a detachable identity authentication and encryption device in communication with the host via a bus interface, wherein the identity authentication and encryption device stores therein the first private key, which is used to pass the identity authentication, generates the file encryption key, uses the file encryption key to encrypt the specified file into the encrypted file, uses the first private key or the identity private key to make the digital signature for the encrypted file, uses the second public key to encrypt the file encryption key into the encrypted key, and transmits the digital signature to the second user device, which also passes the identity authentication, via the server along with the first public key or identity public key, the encrypted key and the encrypted file.

8. The system according to claim 5, wherein the second user device includes a detachable identity authentication and encryption device; when the identity authentication and encryption device is detachably connected to a bus interface of the second user device, the server executes the identity authentication of the second user device; and the second user device automatically runs a browser program to have a display show a user interface for a user to input data if the second user device passes the identity authentication.

9. The system according to claim 8, wherein the server is a server set including a cipher server, a file server and a Fast Identity Online (FIDO) server, wherein the cipher server performs encryption/decryption for the detachable identity authentication and encryption device, the file server temporarily stores the encrypted file and the browser program, and works as a relying party application server (RP app server) for registration and verification of users, and the FIDO server is disposed at a distant end and allowed to be shared with an external server.

10. A system for managing data-file transmission and access right to a specified file, comprising:
a first user device corresponding to a pair of first public key and first private key;
a second user device corresponding to a pair of second public key and second private key; and
a server in communication with the first user device and the second user device,
wherein the first user device or the server uses a file encryption key to encrypt the specified file into an encrypted file, uses the second public key to encrypt the file encryption key into a first encrypted key, processes the encrypted file into a ciphertext file having a specific file header format containing the first encrypted key, and stores the ciphertext file into the server so that the second user device is allowed to use the second private key to decrypt the ciphertext file and retrieve the specified file.

11. The system according to claim 10, further comprising a third user device being in communication with the server and sharing the pair of second public key and second private key with the second user device so that the third user device is allowed to use the second private key to decrypt the ciphertext file and retrieve the specified file.

12. The system according to claim 10, further comprising a third user device being in communication with the server and corresponding to a pair of third public key and third private key, wherein the first user device or the server further uses the third public key to encrypt the file encryption key into a second encrypted key, and the specific file header format of the ciphertext file contains the second encrypted key in addition to the first encrypted key, so that the third user device is allowed to use the third private key to decrypt the ciphertext file and retrieve the specified file.

13. The system according to claim 12, wherein the specific file header format of the ciphertext file has a constant bit length, which does not change with addition of the second encrypted key.

14. The system according to claim 10, wherein the first user device includes a host and a detachable identity authentication and encryption device in communication with the host via a bus interface, and the identity authentication and encryption device stores therein the first private key, which is used to pass the identity authentication.

15. The system according to claim 10, wherein the second user device includes a detachable identity authentication and encryption device; when the identity authentication and encryption device is detachably connected to a bus interface of the second user device, the server executes the identity authentication of the second user device; and the second user device automatically runs a browser program to have a display show a user interface for a user to input data if the second user device passes the identity authentication.

* * * * *